United States Patent
Coker et al.

(10) Patent No.: US 7,437,720 B2
(45) Date of Patent: Oct. 14, 2008

(54) EFFICIENT HIGH-INTERACTIVITY USER INTERFACE FOR CLIENT-SERVER APPLICATIONS

(75) Inventors: John L. Coker, Hillsborough, CA (US); Domingo Mihovilovic, Menlo Park, CA (US); Anil Mukundan, San Jose, CA (US); Fuad Rashid, San Mateo, CA (US); Thomas M. Rothwein, San Jose, CA (US)

(73) Assignee: Siebel Systems, Inc., San Mateo, CA (US)

( * ) Notice: Subject to any disclaimer, the term of this patent is extended or adjusted under 35 U.S.C. 154(b) by 146 days.

(21) Appl. No.: 10/185,890

(22) Filed: Jun. 27, 2002

(65) Prior Publication Data

US 2004/0015981 A1    Jan. 22, 2004

(51) Int. Cl.
G06F 9/44    (2006.01)

(52) U.S. Cl. .................... 717/167; 717/116; 715/764; 709/231; 719/331

(58) Field of Classification Search .......... 345/700, 345/733, 738, 702, 703, 760, 763; 717/100–167; 718/1; 709/200–253; 715/500–542, 700–798; 705/700–769; 719/311–320, 328–332
See application file for complete search history.

(56) References Cited

U.S. PATENT DOCUMENTS

| | | | | |
|---|---|---|---|---|
| 5,473,772 A * | 12/1995 | Halliwell et al. | ............ | 717/171 |
| 5,479,601 A * | 12/1995 | Matheny et al. | ............. | 715/700 |
| 5,557,729 A * | 9/1996 | Frean | .......................... | 715/803 |
| 5,838,906 A * | 11/1998 | Doyle et al. | ................. | 709/202 |
| 5,995,756 A * | 11/1999 | Herrmann | .................... | 717/178 |
| 6,118,939 A * | 9/2000 | Nack et al. | ................... | 717/109 |
| 6,216,157 B1 * | 4/2001 | Vishwanath et al. | ........ | 709/208 |
| 6,286,051 B1 | 9/2001 | Becker et al. | | |
| 6,324,517 B1 | 11/2001 | Bingham et al. | | |
| 6,353,850 B1 * | 3/2002 | Wies et al. | ................... | 709/203 |
| 6,405,223 B1 * | 6/2002 | Kelley et al. | ................. | 715/511 |
| 6,421,708 B2 * | 7/2002 | Bettis | ......................... | 709/206 |
| 6,559,871 B1 * | 5/2003 | Brozowski et al. | .......... | 345/853 |
| 6,580,431 B1 * | 6/2003 | Deosaran et al. | ............ | 345/503 |
| 6,636,242 B2 * | 10/2003 | Bowman-Amuah | ......... | 715/764 |
| 6,836,886 B2 * | 12/2004 | Tuerke et al. | ............... | 717/178 |
| 2002/0073197 A1 * | 6/2002 | Bhogal et al. | ............... | 709/224 |
| 2002/0135611 A1 * | 9/2002 | Deosaran et al. | ............ | 345/738 |
| 2003/0046401 A1 * | 3/2003 | Abbott et al. | ............... | 709/228 |
| 2003/0195923 A1 * | 10/2003 | Bloch et al. | ................. | 709/203 |
| 2006/0136593 A1 * | 6/2006 | Silky et al. | .................. | 709/227 |

* cited by examiner

Primary Examiner—Meng-Ai An
Assistant Examiner—Diem K Cao
(74) Attorney, Agent, or Firm—Campbell Stephenson LLP

(57) ABSTRACT

A facility for improving for performance of an initial user interface for a client-server application is described. The facility selects a proper subset of the user interface elements of the initial user interface. For each selected element, the facility generates a more efficient replacement for the selected element. The facility then generates a revised user interface that includes the unselected elements of the initial user interface, together with the generated replacements for the selected elements of the initial user interface.

8 Claims, 4 Drawing Sheets

EFFICIENT HIGH-INTERACTIVITY USER INTERFACE FOR CLIENT-SERVER APPLICATIONS

TECHNICAL FIELD

The present invention relates to user interface techniques and implementations.

BACKGROUND

In client-server applications, a user interacts directly with a client computer system to use an application program executing on a server computer system, which is often physically remote from the client computer system. In some client-server applications, data can be created in a database managed by the application, and retrieved, manipulated, and displayed based upon a combination of user commands and business rules incorporated in the application. For example, a typical application may be used by users to store, retrieve, and manipulate information about the users' relationships with customers.

Original client-server applications provided little functionality at the client computer system beyond displaying data, allowing the user to enter data and instructions, and allowing the user to submit entered data or instructions to the server. For example, the user may enter text into each field of a displayed 15-field form, then select a submit button to submit all of the entered text to the application on the server.

Client-server applications having such "low-interactivity" user interfaces have the advantage that they impose modest requirements on client hardware, which can typically be satisfied by dumb terminals or microcomputer systems running very simple client programs, such as terminal emulators or basic web browsers. Additionally, because only small quantities of data and instructions are passed between client and server by low-interactivity user interfaces, inexpensive and ubiquitous low-speed connections between client and server are typically adequate to support low-interactivity user interfaces.

Low-interactivity user interfaces have significant disadvantages, however. Because the user of a low-interactivity user interface can typically only enter data into all of the fields of a displayed form, then submit the contents of the entire form, the user is unable to obtain any feedback from the application during the time that the user is filling out individual fields of the form. For example, if the user enters an invalid value into the first field of a 15-field form, the user will not discover the error until after the user has filled out all 15 fields and submitted their contents. Further, once the user has entered a valid value into a field of a form, the application has no mechanism to modify the set of fields displayed in the form, or suggest a value for another field in the form, based upon entry of the value.

Some disadvantages of low-interactivity user interfaces are overcome by conventional high-interactivity user interfaces for client-server applications. Typical conventional high-interactivity user interfaces are constructed by defining web pages in Dynamic Hypertext Markup Language (DHTML), which are delivered to a web browser on the client computer system together with JavaScript code. The JavaScript code for responds to various types of user input by updating the web page by modifying its DHTML definition. Such modification may be done based on logic in the JavaScript code, or based on logic in the server code for the application in response to a request transmitted by the JavaScript code. Such conventional high-interactivity user interfaces are typically able to provide a higher level of interactivity, by processing user input events such as individual keystrokes and mouse clicks, and providing feedback directly in response to these finer-grained events.

Conventional high-interactivity user interfaces have their own disadvantages, however.

In most web browsers, DHTML is slow to update, no matter what mechanism is used to update it. Additionally, because JavaScript is an interpreted language, the JavaScript code used in typical conventional high-interactivity user interfaces executes slowly, further degrading the performance, and therefore the apparent responsiveness, of typical conventional high-interactivity user interface implementations.

Accordingly, a high-interactivity user interface for client-server applications that overcomes the above-discussed disadvantages of typical low-interactivity user interfaces and conventional high-interactivity user interfaces would have significant utility.

DETAILED DESCRIPTION

A software facility for efficiently implementing a high-interactivity user interface for client-server applications ("the facility") is provided. In accordance with some embodiments of the facility, the performance of a legacy high-interactivity user interface implementation is analyzed to identify aspects of the legacy implementation where the user experience is most significantly degraded by performance shortfalls. Such analysis may be performed using automated performance analysis tools, human analysts, or both.

Following such analysis, in some embodiments the facility creates a revised implementation of the high-interactivity user interface in accordance with two objectives (1) replacing aspects of the legacy implementation whose performance is identified as most significantly degrading the user experience, and (2) mimicking the look and feel of the user interface provided by the legacy implementation (aside from the performance improvements produced by the replacements). In some embodiments, the replacement involves replacing DHTML display elements with more efficient display elements such ActiveX controls, and/or replacing interpreted code for receiving and processing user interactions and updating display elements—such as JavaScript code—with compiled code—such as compiled code written in the C programming language or its variants ("C code") or compiled code of another type, such as Java code. This revised user interface implementation created by elements of the facility executes more quickly, and is typically able to provide a better user experience than either a low-interactivity user interface or the legacy implementation of the high-user interactivity user interface.

In some embodiments, the facility makes a combination of user interface implementations available to users of a client-server application. For example, in some embodiments, the low-interactivity user interface, the legacy implementation of the high-interactivity user interface, and the replacement implementation of the high-interactivity user interface may all be simultaneously available for use by users. In other embodiments, a subset or a superset of these user interface implementations may be available. Particular users can select to use a particular available user interface implementation—or a particular available user interface implementation may be automatically selected for a user—based upon factors such as the following: the level of interactivity desired by the user; the set of computing resources available to user, including the speed of the user's network connection; the user's preference for using a particular user interface that is familiar to the user; etc. This per-user level of selectivity among different user interface implementations enables individual users to take advantage of user interface implementations best suited to their needs.

Figure 1:
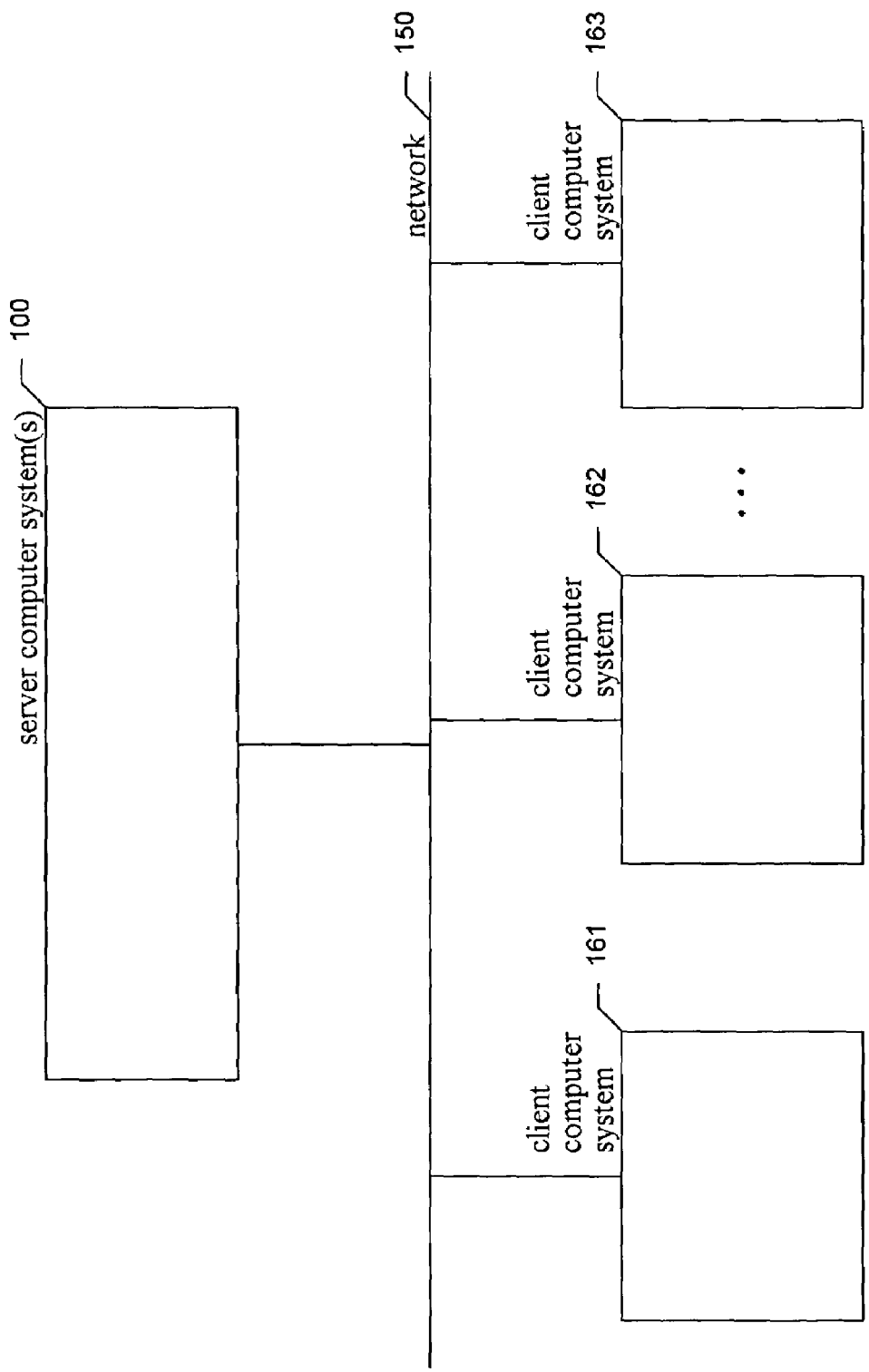
FIG. 1 is a network diagram showing aspects of a typical hardware environment in which the facility operates.

FIG. 1 is a network diagram showing aspects of a typical hardware environment in which the facility operates. The network diagram shows one or more server computer systems 100 upon which the server side of a client-server application executes. Multiple server computer systems may be located together in a single location, or distributed across a number of different locations. The server computer systems 100 are connected to a number of different client computer systems 161-163 via a network 150. Each of the client computer systems enables one or more users to access and use the client-server application executing on the server computer system. These client computer systems may be a variety of different devices, including desktop or laptop general-purpose computer systems; personal digital assistants; wired and wireless telephones, etc. The network 150 may use a variety of different networking technologies, including wired, guided or line-of-sight optical, or radio frequency networking. In some embodiments, the network includes the public switched telephone network. Network connections between a client and a server may be fully-persistent, session-based, or intermittent, such as packet-based.

Figure 2:
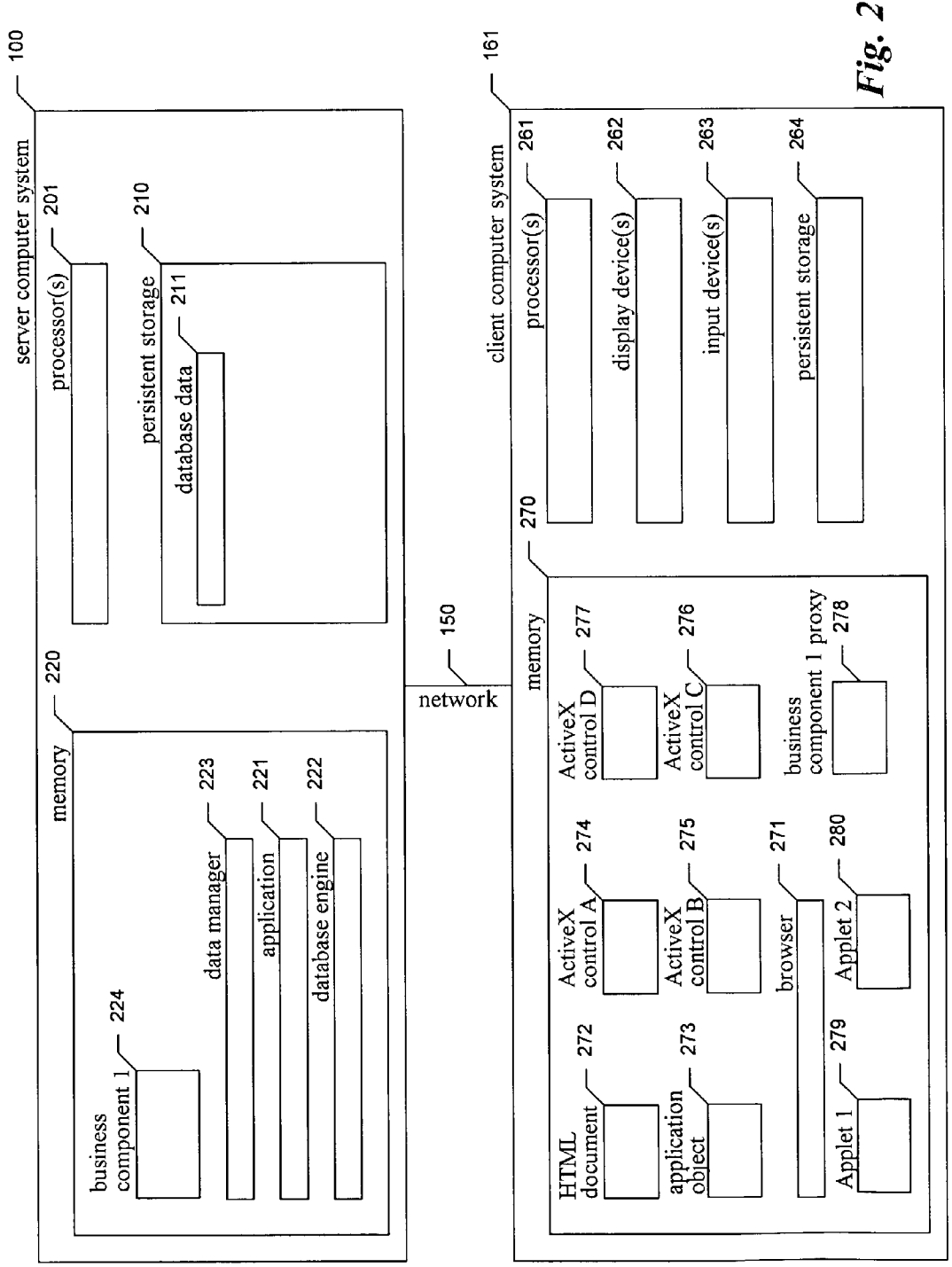
FIG. 2 is a network diagram showing additional details of a typical hardware environment in which the facility operates.

FIG. 2 is a network diagram showing additional details of a typical hardware environment in which the facility operates. One of the server computer systems 100 includes one or more central processing units ("processors") 201 for executing computer programs; a computer memory 220 for storing programs and data—including data structures—while they are being used; and a persistent storage device 210, such as a hard drive, for persistently storing programs and data. The persistent storage 210 is shown to include database data maintained for use by the application. The memory 220 is shown to include a database engine 222 for storing, retrieving, and otherwise accessing the database data 211; the application 221; a data manager program 223 for providing access to the database data, via the database engine 222, for the application 221; and a business component 224 that abstracts certain of the database data 211 for use in the application. As is apparent to one of ordinary skill in the art, the persistent storage 210 and memory 220 may have various other contents, not shown. Further, data may be transferred between persistent storage and memory, and between individual storage devices, for purposes such as optimizing the availability of particular data and safeguarding the persistence of particular data.

The client computer system 161 includes one or more central processing units 261 for executing computer programs; one or more display devices 262 for displaying program output, such as video monitors or LCD panels; one or more input devices 263 for receiving user input, such as keyboards, microphones, or pointing devices such as a mouse; persistent storage 264, such as a hard drive, for persistently storing programs and data; and a computer memory 270 for storing programs and data—including data structures. The memory 270 is shown to include a web browser program 271 through which the client-server application extends its user interface to the user of the client computer system; an HTML document 272 representing the current display of the client-server application's user interface; an application object 273 representing the autonomous display elements in the current HTML document in the aggregate; four ActiveX controls 274-277, each representing one of the four autonomous display elements in the current HTML document; and a proxy 278 of the business component 224 residing on the server computer system. The elements shown in memory 270 are discussed in greater detail below.

While computer systems configured as described above are typically used to support the operation of the facility, one of ordinary skill in the art will appreciate that the facility may be implemented using devices of various types and configurations, and having various components.

In the discussion that follows, embodiments of the facility are described in conjunction with a variety of illustrative examples. One of ordinary skill in the art will appreciate that embodiments of the facility may be used in circumstances that diverge significantly from these examples in various respects.

Figure 3:
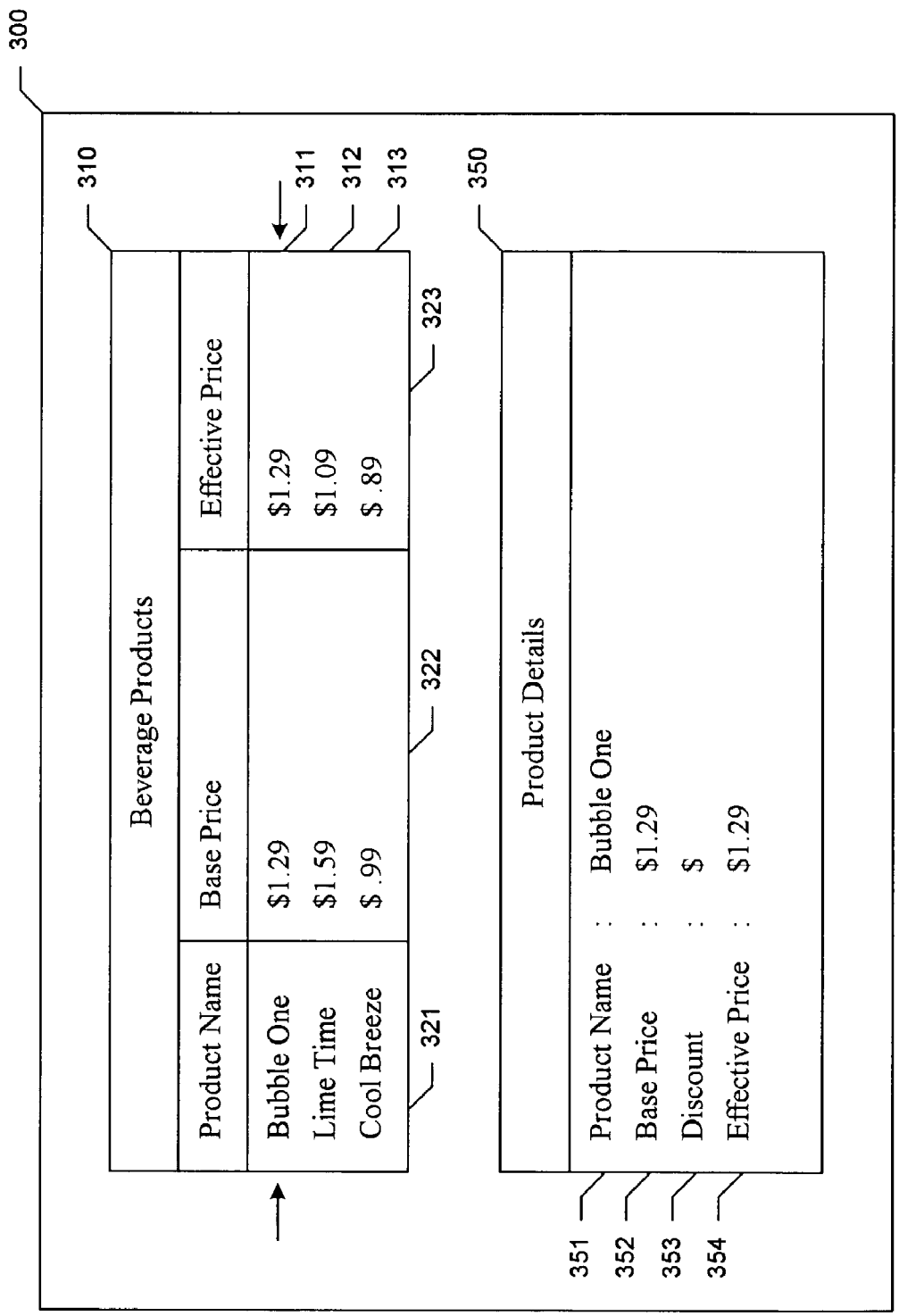
FIG. 3 is a display diagram showing a sample user interface that may be presented by the facility.

FIG. 3 is a display diagram showing a sample user interface that may be presented by the facility. The sample user interface shows products in a beverage product group, the pricing of which is managed by the application. The user interface 300, typically presented in the client area of the main window displayed by a web browser program executing on the client, contains two first-level user interface elements 310 and 350. Elements 310 and 350 are variously called "subwindows" or "user interface applets," and each contain various second-level user interface elements. Subwindow 310 contains rows 311-313, each containing the product name 321, base price 322, and effective price 323 of a different product that is part of the beverage product group. In subwindow 310, it can be seen that row 311, for the Bubble One product, has been selected by the user.

Subwindow 350 shows details about the product whose row is selected in subwindow 310. It can be seen that subwindow 350 contains the product name 351, base price 352, discount 353, and effective price 354 for the Bubble One product.

The user interface shown in FIG. 3 may be provided by a legacy high-interactivity user interface implementation, as well as by a replacement high-interactivity user interface implementation. For example, in a legacy high-interactivity user interface implementation, much of the user interface 300, including all of the contents of subwindows 310 and 350, may be specified as DHTML included in HTML document. JavaScript routines, downloaded as part of the HTML document, may be executed-in an interpreted manner-to respond to user input. For example, the JavaScript routines may receive user interface events corresponding to the user clicking on one of the rows of subwindow 310, or entering data in one of the fields of subwindow 350. Where such response requires updating the display, the JavaScript routines may perform such updating by modifying the DHTML specifying the appearance of one or both of the subwindows.

In some embodiments, the facility determines which aspects of the legacy implementation of the user interface including the sample user interface display shown in FIG. 3 most significantly degrade the user experience of users using this user interface implementation. In the example, the facility may determine that the aspects of the legacy user interface implementation that manage user interface elements 310, 352, 353, and 354 most significantly degrade the user experience. The facility may make such a determination based upon such factors as: which pages or other units of the user interface are most important to users; which types of elements on pages of the user interface are most important; and which specific user interface elements, such as particular subwindows and buttons, are most important. The measures of importance discussed above may be determined based upon such factors as: which aspects of the user interface are objectively the slowest to respond to user input; which aspects of the user interface are perceived by users to be the slowest to respond to user input; which aspects of the user interface are most often used by users; as well as other bases for determining that particular aspects of the user interface are more visible or important than others.

For each of the selected user interface elements, the facility creates a revised implementation of the user interface element. In some embodiments, the facility does so by removing this element from the DHTML code specified for the page, and substituting an ActiveX control.

The general nature of ActiveX controls is discussed, for example, in Cluts, Nancy, Microsoft ActiveX Controls Overview, Oct. 23, 1998, available at msdn.microsoft.com/library/en-us/dnaxctrl/html/msdn_actxcont.asp; and Johns, Paul, The ABCs of MFC ActiveX Controls, Oct. 22, 1996, available at msdn.microsoft.com/library/en-us/dnaxctrl/html/msdn_abcsmfc.asp, each of which is hereby incorporated by reference in its entirety.

The construction of an ActiveX control for incorporation in a web page is discussed, for example, in Cluts, Nancy Winnick, Creating ActiveX Components in C++, November, 1996, available at msdn.microsoft.com/library/en-us/dnaxctrl/html/msdn_creaactx.asp; and Microsoft Corporation, Using ActiveX Controls to Automate Your Web Pages, available at msdn.microsoft.com/workshop/components/activex/tutorial.asp, each of which is hereby incorporated by reference in its entirety. In some embodiments, the ActiveX controls substituted by the facility are constructed in a compiled programming language, such as the C programming language or its variants, which include the C++ programming language.

The process of incorporating an ActiveX control in a web page is discussed, for example, in Microsoft Corporation, Deploying ActiveX Controls on the Web with the Internet Component Download, April, 1997, available at msdn.microsoft.com/library/en-us/dnaxctrl/html/msdn_deplactx.asp; and Powell, Adam, Embedding a Windows Media Player, Dec. 5, 2001, available at hotwired.lycos.com/webmonkey/01/49/index2a.html?tw=multimedia, each of which is hereby incorporated by reference in its entirety.

When the revised implementation of the page shown in FIG. 3 is downloaded, shown as HTML document 272 in FIG. 2, it contains references to the four ActiveX controls created to represent user interface elements 310, 352, 353, and 354—as well as identifications of subregions of the page whose display is to managed by these ActiveX controls. The browser uses these references to download the ActiveX controls from a server—either one of the server computer systems 100, or a different server—into the memory of the client computer system, shown as ActiveX controls 274-277 in FIG. 2. The compiled code that is included in these ActiveX objects is called by the browser in order to display the subregions of the user interface reserved for the ActiveX controls. The browser also calls the code associated with the ActiveX controls when the browser receives user interface interactions, such as typed characters, mouse clicks, or voice input, intended for one of the controls. Processing such input may include applying logic on the client computer system, and/or sending a request to the server computer system. In some embodiments, the browser also uses information specifying a visual context for the user interface controls to download the ActiveX controls. For example, as illustrated in FIG. 3, the visual context information for user interface element 352 may indicate that user interface element 353 is to be displayed between product name 351 and discount 353 in first-level user interface element 350. The visual context information may also specify other information and/or data that appear in user interface 300 alone with user interface element 352.

The downloaded revised implementation of the page shown in FIG. 3 also typically contains references that cause the instantiation of objects of three additional types on the client computer system: a business component proxy object, an application object, and two Applet objects. The business component proxy object, shown as business component 1 proxy 277 in FIG. 2, provides an interface to objects on the client computer system for interacting with a corresponding business component object on the server computer system, shown as business component 1 224 in FIG. 2. Though only a single business component proxy object is instantiated in this example, the facility typically instantiates a different business component proxy object for each business component object whose data is used in presenting the current page. The application object, shown as application object 273 in FIG. 2, represents the entire page shown in FIG. 3, and is responsible for brokering all remote procedure calls made to the server computer system by objects on the client computer system. The Applet objects 279 and 280 each correspond to an Applet or other first-level user interface component displayed as part of the current page. For example, Applet object 1 279 corresponds to Applet 310 shown in FIG. 3, while Applet object 2 280 corresponds to Applet 350 shown in FIG. 3. The Applet objects are involved in routing information between ActiveX controls and controls of other types and the appropriate business component proxy objects.

When the user interface is in the state shown in FIG. 3, the user may enter a value into the discount field 353 of subwindow 350 containing details about Bubble One product, such as by clicking on this field and typing the amount of the discount. For example, the user may click on the discount field and enter the value $0.30. The browser routes these user input events to the ActiveX control corresponding to field 353. The code in this ActiveX control processes these user input events by invoking a method on the business component 1 proxy object to update the corresponding business component on the server, which authoritatively maintains the current value of the discount field for the Bubble One product. The business component proxy object 277 passes the method invocation to the business component 224 via the application object 273. When the business component receives the invocation, it typically both (1) updates the current value of the discount field for the Bubble One product that it maintains in memory as a data member, and (2) stores this updated value persistently, by calling the data manager 223, which in turn calls the database engine 222 to persistently store the updated value among the database data 211 on the persistent storage device 210. In some embodiments, the persistent storage step is deferred until it can be batched with other similar persistent storage requests.

As the result of its update, the business component determines that the values of both the discount field and the effective price field for the Bubble One product have changed, and sends the updated values for these fields to the business component proxy 277 via the application object 273. In response, the business component calls each of the Applet objects that depends on the current value of the discount and effective price fields, in this case both Applet object 1 279 and Applet object 2 280. The Applet objects in turn call each of the ActiveX objects that have registered to receive updates for the two data fields that changed. In this example Applet object 2 280 for Applet 350 calls the ActiveX control for discount field 353, which registered for the discount field, and the ActiveX control for effective price field 354, which registered for the effective price field, while Applet object 1 279 for Applet 310 calls the ActiveX control for subwindow 310, which registered for the effective price field. Each of the called ActiveX controls redisplays itself to incorporate the updated value.

Figure 4:
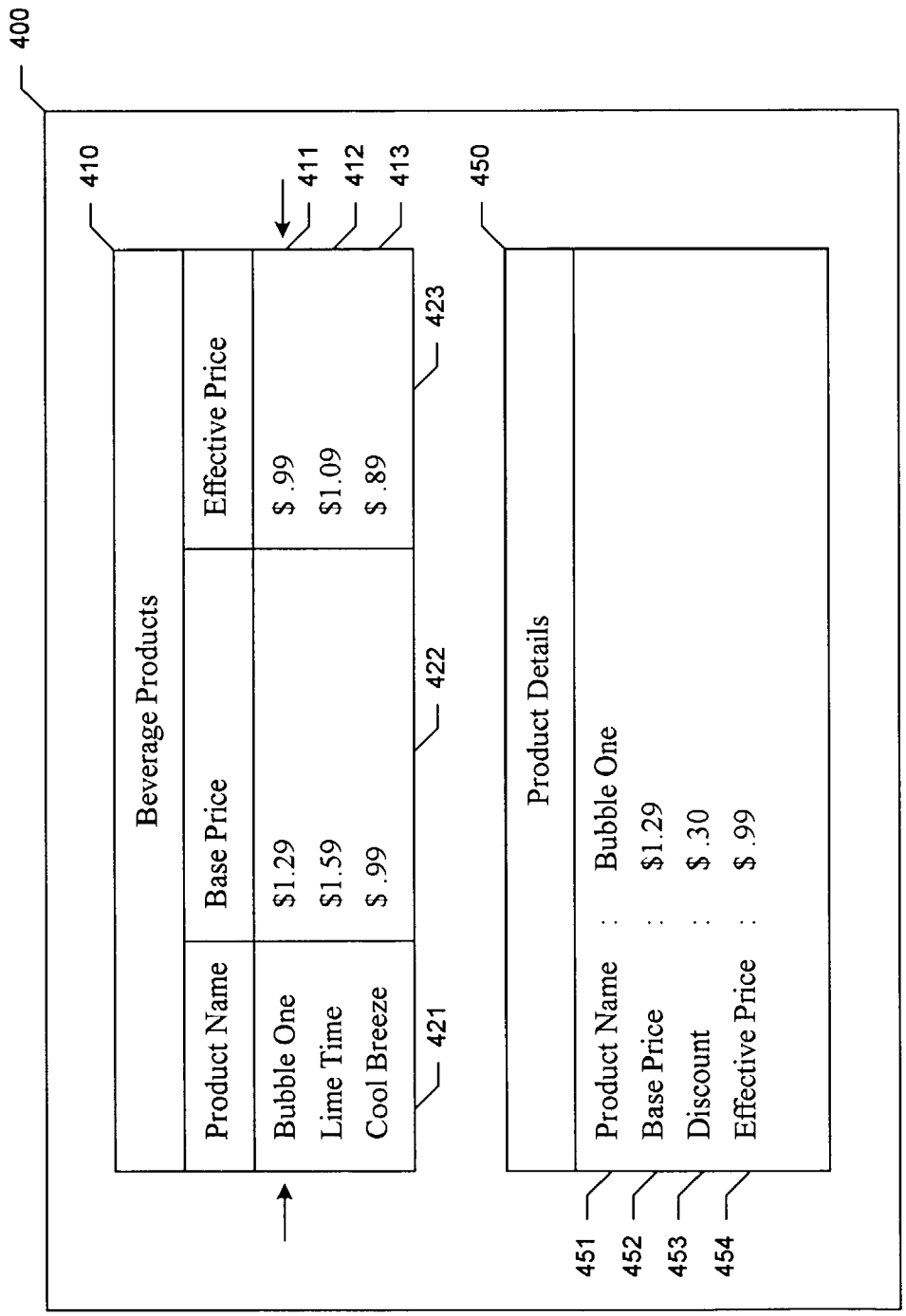
FIG. 4 is a display diagram showing the sample user interface presented by the facility as updated in response to user input.

FIG. 4 is a display diagram showing the version of the sample user interface presented by the facility after the ActiveX controls have been called as described above. It can be seen that discount field 453 reflects the discount entered by the user, $0.30; that the effective price field 454 contains the new effective price of the Bubble One product in view of the new discount, $0.99; and that subwindow 410 contains this new effective price at the intersection of row 411 and column 423.

In some embodiments, the ActiveX controls may be called to update their displays to reflect changes in the state of the business component object not caused by the user of the user interface, such as changes in the state of the business component object caused by other users, or by other external events. Additionally, the server may host any number of business component objects. Each client can instantiate proxies for any subset of these business component objects, as required by the user interface presently employed at the client.

As discussed above, embodiments of the facility can permit two or more different implementations of a single user interface to be available simultaneously. Users may manually elect between the different user interface implementations, or one may be chosen for them automatically. In some embodiments, a particular page of a particular user interface implementation may employ a variety of different client-side user interface technologies.

It will be appreciated by one of ordinary skill in the art that the above-described facility may be straightforwardly adapted or extended in various ways. For example, various techniques may be used to identify user interface elements for replacement. For a single such identified user interface element, a variety of different replacement elements may be made available, each being advantageous in certain situations. Further, various client-side user interface technologies may be used in the user interfaces provided by the facility. Additionally, where different versions of a user interface or user interface element are available, virtually any basis may be used to select one for use by a particular user or a group of users. Further, the facility is suited for use with virtually any kind of client-server application. While the foregoing description makes reference to preferred embodiments, the scope of the invention is defined solely by the claims that follow and the elements recited therein.

We claim:

1. A computer system comprising:
   a processor; and
   a network interface, coupled to the processor, and configured to receive data signals comprising a data structure specifying a display presented by a remote application, wherein the data structure comprises
      in a display specification, inter-node references to compiled code implementing one or more user interface controls, the implemented user interface controls providing user interaction elements for the remote application, and
      information specifying a visual context for the implemented user interface controls, wherein
         the processor is configured to execute instructions using the references to copy the referenced compiled code to the client.

2. The computer system of claim 1, wherein
   the processor is configured to execute instructions to display the implemented user interface controls within the context specified by the information using the copied referenced compiled code to receive user interactions intended for the remote application.

3. The computer system of claim 1 wherein the implemented user interface controls are ActiveX controls.

4. The computer system of claim 1 wherein the implemented user interface controls are Java controls.

5. A method comprising:
   receiving a data structure specifying a display presented by a remote application executing on a remote network node, wherein the data structure comprises
      in a display specification, inter-node references to compiled code implementing one or more user interface controls, the implemented user interface controls providing user interaction elements for the remote application, and
      information specifying a visual context for the implemented user interface controls; and
   copying the referenced compiled code to the remote network node, said copying performed using the inter-node references.

6. The method of claim 5 further comprising:
   displaying the implemented user interface controls within the context specified by the information using the copied referenced compiled code to receive user interactions intended for the remote application.

7. The method of claim 5 wherein the implemented user interface controls are ActiveX controls.

8. The method of claim 5 wherein the implemented user interface controls are Java controls.

* * * * *

UNITED STATES PATENT AND TRADEMARK OFFICE
CERTIFICATE OF CORRECTION

| | | |
|---|---|---|
| PATENT NO. | : 7,437,720 B2 | Page 1 of 1 |
| APPLICATION NO. | : 10/185890 | |
| DATED | : October 14, 2008 | |
| INVENTOR(S) | : Coker et al. | |

It is certified that error appears in the above-identified patent and that said Letters Patent is hereby corrected as shown below:

Title Page; item (57);
In column 2, line 1, (Abstract), delete "for performance" and insert -- the performance --, therefor.

In column 6, line 12, delete "alone" and insert -- along --, therefor.

Signed and Sealed this

Twentieth Day of April, 2010

David J. Kappos
*Director of the United States Patent and Trademark Office*